United States Patent
Iketani et al.

(10) Patent No.: US 8,491,106 B2
(45) Date of Patent: Jul. 23, 2013

(54) LIQUID SUPPLY MEMBER, METHOD FOR MANUFACTURING THE SAME, AND METHOD FOR MANUFACTURING LIQUID EJECTION HEAD

(75) Inventors: Masaru Iketani, Atsugi (JP); Osamu Morita, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 461 days.

(21) Appl. No.: 12/905,885

(22) Filed: Oct. 15, 2010

(65) Prior Publication Data
US 2011/0114207 A1    May 19, 2011

(30) Foreign Application Priority Data
Nov. 18, 2009    (JP) ................................. 2009-263075

(51) Int. Cl.
*B41J 2/175* (2006.01)
(52) U.S. Cl.
USPC .............................................................. 347/85
(58) Field of Classification Search
USPC ......................................... 347/84, 85, 89, 93
See application file for complete search history.

(56) References Cited

U.S. PATENT DOCUMENTS

| | | | |
|---|---|---|---|
| 6,598,963 B1 * | 7/2003 | Yamamoto et al. | 347/85 |
| 8,317,305 B2 * | 11/2012 | Kitagawa et al. | 347/85 |
| 8,348,363 B2 * | 1/2013 | Yamamoto | 347/85 |
| 2007/0195137 A1 | 8/2007 | Morita | |

FOREIGN PATENT DOCUMENTS

| | | |
|---|---|---|
| JP | 2005-096422 A | 4/2005 |
| JP | 2005-271315 A | 10/2005 |
| JP | 2006-341557 A | 12/2006 |

* cited by examiner

*Primary Examiner* — Kristal Feggins
(74) *Attorney, Agent, or Firm* — Canon USA Inc. IP Division

(57) ABSTRACT

A method is provided for manufacturing a liquid supply member including a transmissive member and a transmissive member, one of which having a groove, and configured to supply liquid to a liquid ejection port. The method includes bringing the transmissive member and the absorptive member into contact, with the groove inside; forming a supply passage by radiating laser light, via the transmissive member, from a plurality of first laser light sources disposed along a longitudinal direction of the groove toward a first contact portion at a periphery of the groove to weld the transmissive member and the absorptive member; and radiating laser light, via the transmissive member, from a second laser light source provided in a vicinity of a laser light source at an end of the groove in the longitudinal direction toward a vicinity portion of the absorptive member.

8 Claims, 12 Drawing Sheets

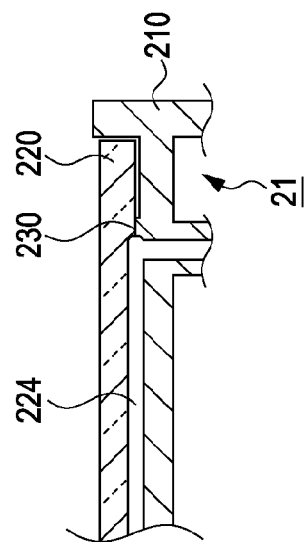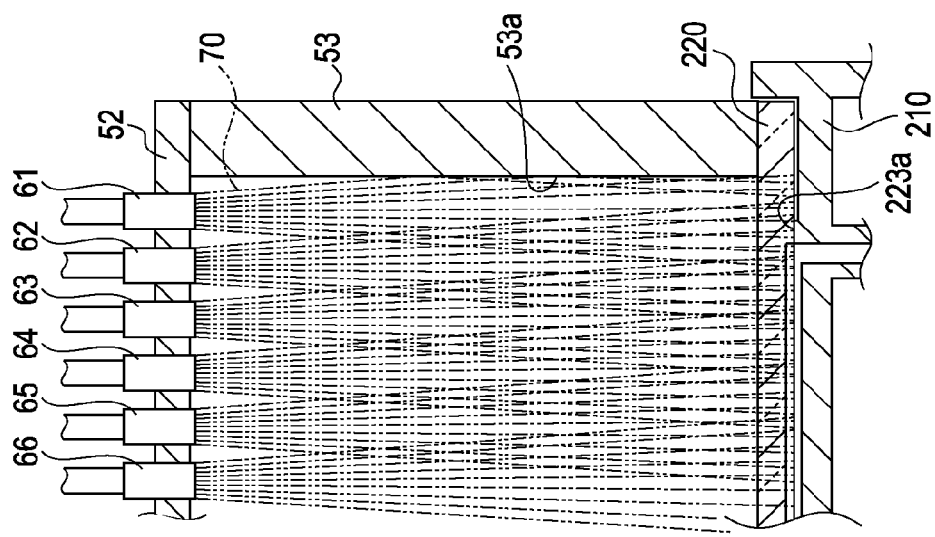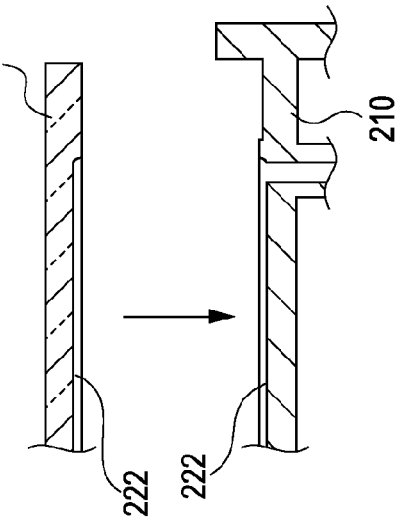

LIQUID SUPPLY MEMBER, METHOD FOR MANUFACTURING THE SAME, AND METHOD FOR MANUFACTURING LIQUID EJECTION HEAD

BACKGROUND OF THE INVENTION

1. Field of the Invention

The present invention relates to a liquid supply member that supplies liquid to liquid ejection ports, a method for manufacturing the liquid supply member, and a method for manufacturing a liquid ejection head.

2. Description of the Related Art

Liquid supply members have supply passages through which liquid is supplied to liquid ejection ports and are used in, for example, inkjet recording heads which are typical as liquid ejection heads having ejection ports.

Referring to FIGS. 10A to 10C, the configuration of a known inkjet recording head will be simply described. An inkjet recording head H1001 is constituted by a tank holder unit H1003 and a recording element unit H1002 for ejecting ink. The tank holder unit H1003 is constituted by a tank holder H1500 and a supply passage plate H1510.

Ink that is supplied from an ink tank (not shown) is introduced to a recording element unit H1002 through an ink supply passage formed in a liquid supply member (ink supply member) provided in the tank holder unit H1003 and is supplied to ejection ports.

FIG. 10B is a bottom view of the tank holder H1500, and FIG. 10C is a top view of the supply passage plate H1510. The tank holder H1500 and the supply passage plate H1510 each have grooves H1600 to be formed into ink supply passages. The tank holder H1500 and the supply passage plate H1510 are joined such that the grooves H1600 overlap with each other, so that ink supply passages are formed in the ink supply member.

A known method for joining the tank holder H1500 and the supply passage plate H1510 is a laser welding method disclosed in Japanese Patent Laid-Open No. 2005-096422.

A method for joining the tank holder H1500 and the supply passage plate H1510 using this laser welding method will be described. First, the tank holder H1500 having a laser-light absorptive property and the supply passage plate H1510 having a laser-light transmissive property are brought into contact with each other using a presser jig. A contact portion 600 at which the tank holder H1500 and the supply passage plate H1510 come into contact with each other is provided next to the grooves H1600. Thereafter, the contact portion 600 is irradiated with laser light, with the tank holder H1500 and the supply passage plate H1510 being in contact, to join the two members, thereby forming ink supply passages.

The method for laser irradiation includes a scanning method and a simultaneous irradiation method.

The scanning method is a method involving scanning the locus of a desired joint surface with laser light having a reduced spot diameter emitted from a laser light irradiator. With this method, it takes a significant amount of time to scan the minute locus of the joint surface with laser light for welding.

On the other hand, the simultaneous irradiation method is a method involving irradiating a desired joint surface with laser light all at once, which can reduce the time involved in welding.

However, in particular, with the simultaneous irradiation method, heat that escapes from the contact portion 600 in the vicinity of the ends of the grooves H1600 in the longitudinal direction to the surroundings is higher than heat that escapes from the contact portion 600 in the vicinity of portions other than the ends. This may generate an unwelded portion at the contact portion 600 in the vicinity of the ends. The presence of the unwelded portion may cause ink leakage.

SUMMARY OF THE INVENTION

The present invention provides a method for manufacturing a liquid supply member in which the possibility of forming an unwelded portion can be reduced when a liquid supply member is formed by emitting laser light to the components thereof to weld them together.

According to an aspect of the present invention, a method is provided for manufacturing a liquid supply member for supplying liquid to a liquid ejection port, wherein the liquid supply member includes a transmissive member being transmissive to laser light and an absorptive member being absorbent to laser light, and at least one of the transmissive member and the absorptive member has a groove to be formed into a supply passage through which liquid is supplied to the ejection port. The method includes bringing the transmissive member and the absorptive member into contact with each other, with the groove inside; forming the supply passage by radiating laser light, via the transmissive member, from a plurality of first laser light sources disposed along a longitudinal direction of the groove toward a first contact portion at a periphery of the groove, at which the transmissive member and the absorptive member are in contact, to weld the transmissive member and the absorptive member together at the first contact portion; and at the forming the supply passage, radiating laser light, via the transmissive member, from a second laser light source provided in a vicinity of a laser light source at an end of the groove in the longitudinal direction, among the plurality of the first laser light sources, toward a vicinity portion of the absorptive member, outside the first contact portion, in a vicinity of the end of the groove in the longitudinal direction, in parallel with the radiation of laser light from the plurality of the first laser light sources.

According to another aspect of the present invention, laser light is radiated from the plurality of first laser light sources disposed along the longitudinal direction of the groove toward the contact portion at which the transmissive member and the absorptive member are in contact. In parallel, laser light is radiated from the second laser light source provided in a vicinity of the first laser light source at an end of the groove in the longitudinal direction among the first laser light sources, toward a vicinity portion, outside the first contact portion, in a vicinity of the end of the groove in the longitudinal direction. This allows heat diffusion from the portion of the contact portion in the vicinity of the end of the groove to the surroundings, thereby reducing the possibility of generation of an unwelded portion.

Further features of the present invention will become apparent from the following description of exemplary embodiments with reference to the attached drawings.

BRIEF DESCRIPTION OF THE DRAWINGS

FIG. 4A is a diagram for describing the first embodiment of the present invention.

FIG. 4B is a diagram for describing the first embodiment of the present invention.

FIG. 4C is a diagram for describing the first embodiment of the present invention.

DESCRIPTION OF THE EMBODIMENTS

Liquid Ejection Head

A liquid ejection head that is supplied with liquid by a liquid supply member according to an embodiment of the present invention will be described using an inkjet recording head as an example.

The inkjet recording head includes at least ejection ports for ejecting ink and an ink supply passage (supply passage) communicating with the ejection ports to supply ink.

An inkjet recording head, which is a component constituting a recording head cartridge, will be described by way of example with reference to FIGS. 8A and 8B.

Figure 8A:
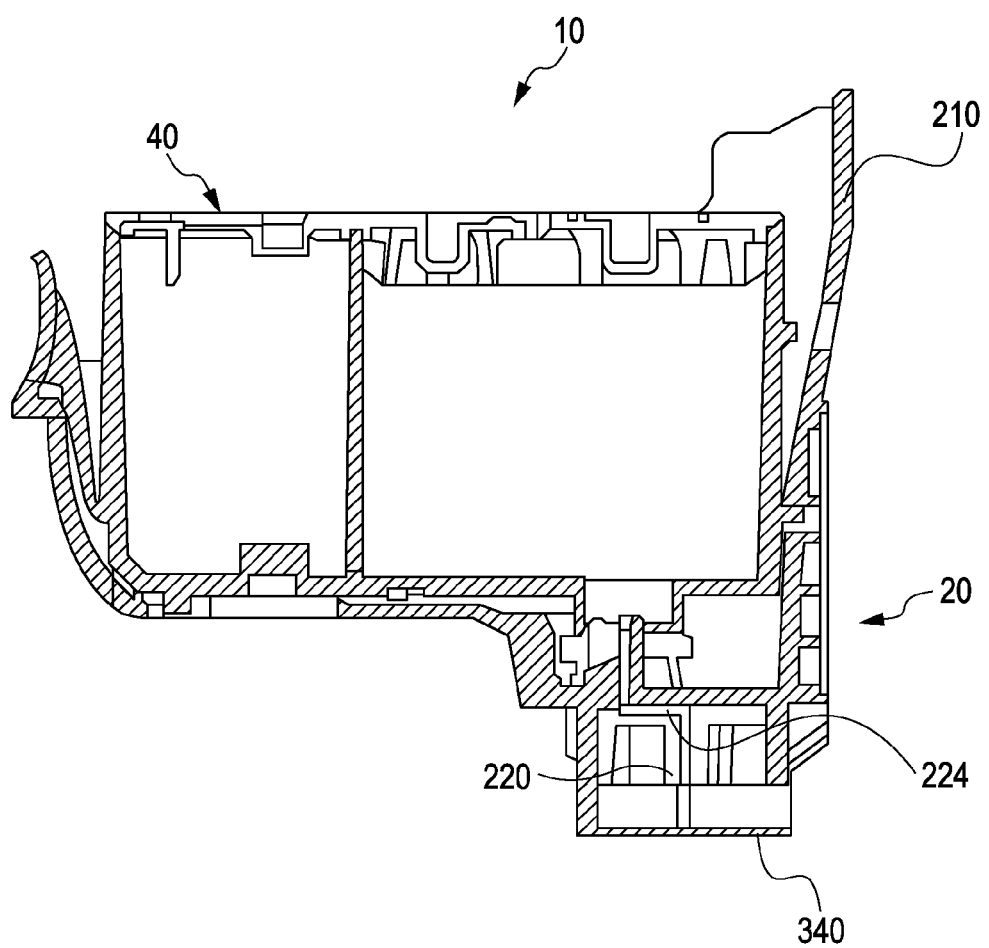
FIG. 8A is a diagram illustrating an inkjet recording head to which the present invention can be applied.

As shown in FIG. 8A, a recording head cartridge 10 is constituted by an inkjet recording head 20 and an ink tank 40 that is detachably mounted to the inkjet recording head 20.

The recording head cartridge 10 is fixedly supported by a positioning unit of a carriage (not shown) disposed in an inkjet recording unit (not shown, hereinafter referred to as a recording unit) and is detachable from the carriage.

Figure 8B:
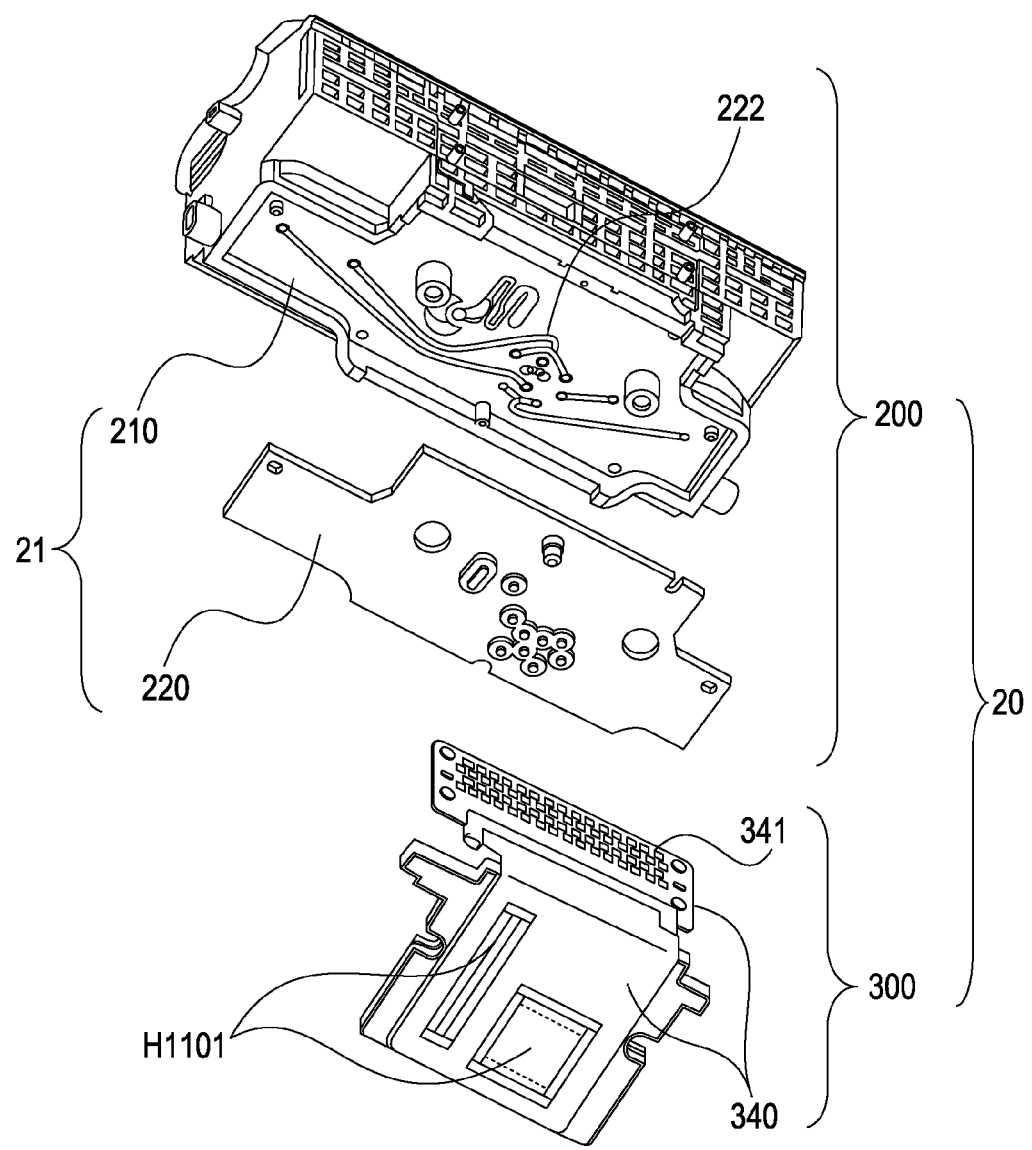
FIG. 8B is a diagram illustrating the inkjet recording head to which the present invention can be applied.

The inkjet recording head 20 drives recording elements in accordance with electric signals sent form the recording unit to emit ink supplied from the ink tank 40 through ejection ports provided in a recording-element substrate H1101, as shown in FIG. 8B. Examples of the recording element include a heating resistor and a piezoresistor. Here, a recording element formed of a heating resistor will be described.

FIG. 8B is an exploded perspective view of the inkjet recording head 20 shown in FIG. 8A. The inkjet recording head 20 is constituted by a recording element unit 300 including an electric wiring substrate 340 and a recording-element substrate H1101, and a tank holder unit 200.

Recording Element Unit

Next, the recording element unit 300 will be described.

The electric wiring substrate 340 includes connection terminals 341 intended for electrical connection with the recording unit, electrode terminals (not shown) intended for electrical connection with the recording-element substrate H1101, wires for connecting the connection terminals 341 and the electrode terminals, and an opening for installing the recording-element substrate H1101.

The electric wiring substrate 340 and the recording-element substrate H1101 are connected as follows, for example. Thermosetting plastic having electrical conductivity is applied to the electrodes of the recording-element substrate H1101 and the electrode terminals of the electric wiring substrate 340, and thereafter, the electrodes and the electrode terminals are collectively heated and pressed using a heat tool to be electrically connected all together. The electrically connected portions of the electrodes and the electrode terminals are protected from corrosion due to ink or external impact by being sealed with a sealant.

Figure 9:
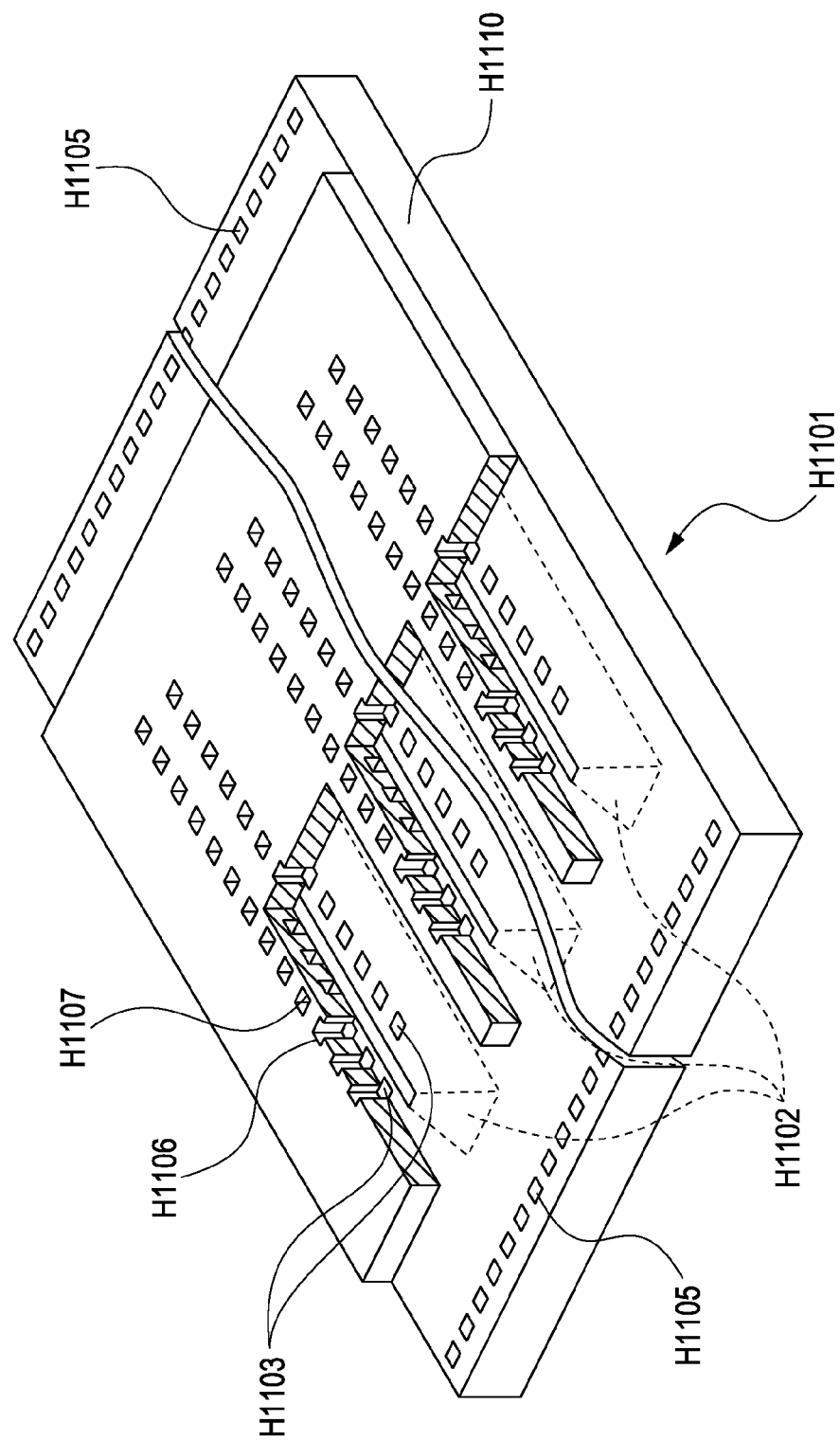
FIG. 9 is a diagram of a recording-element substrate that constitutes the inkjet recording head.
Figure 10A:
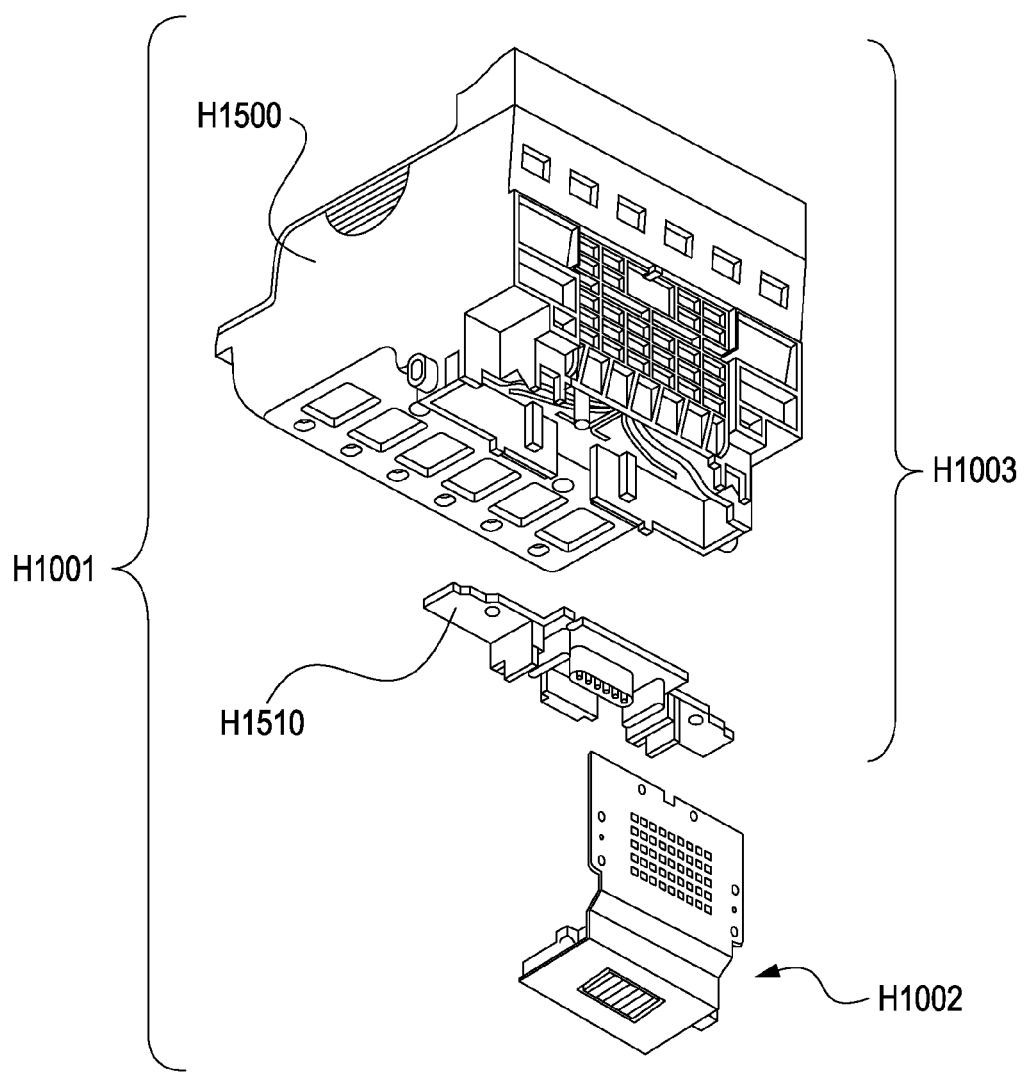
FIG. 10A is a diagram illustrating a known inkjet recording head.
Figure 10B:
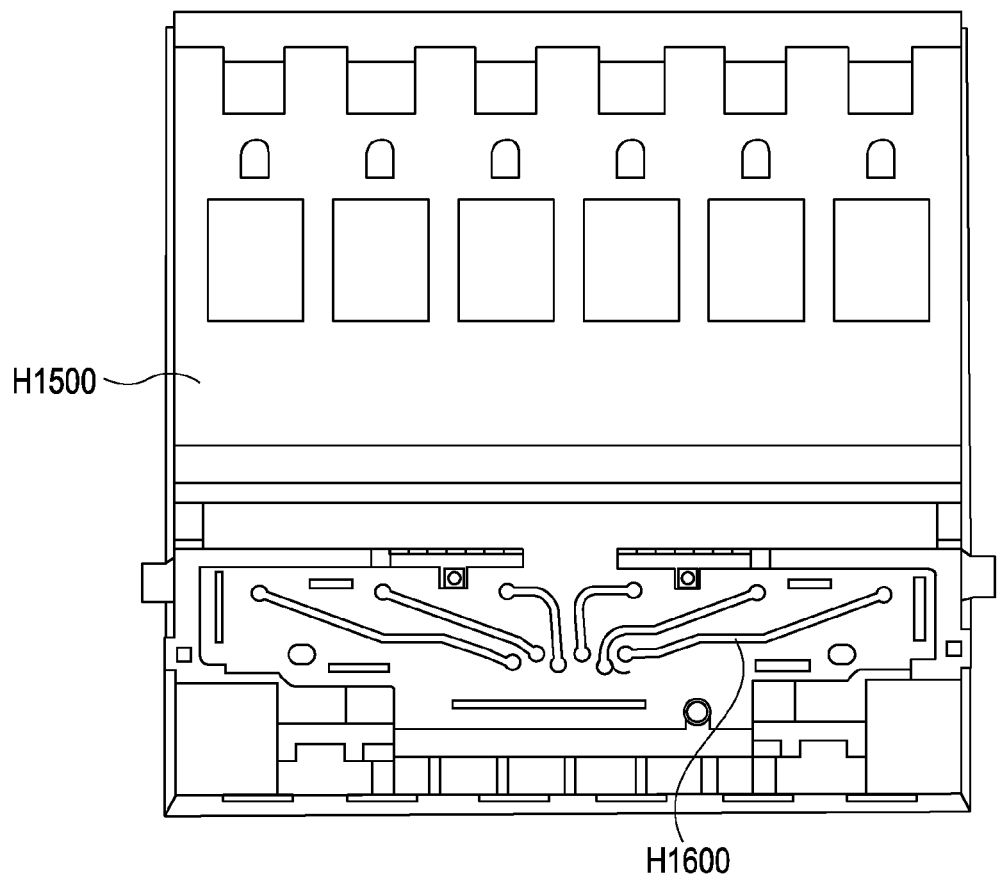
FIG. 10B is a diagram illustrating the known inkjet recording head.
Figure 10C:
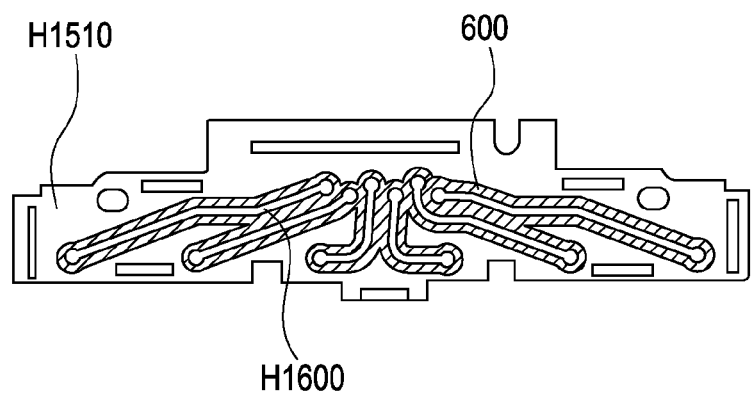
FIG. 10C is a diagram illustrating the known inkjet recording head.

FIG. 9 is a perspective view of the recording-element substrate H1101, partially cut away for describing the configuration thereof.

The recording-element substrate H1101 includes ejection ports H1107 for ejecting ink and ink supply ports H1102 communicating with the ejection ports H1107 to supply ink to the ejection ports H1107. The ejection ports H1107 are formed in an ejection-port forming member H1106, and the ink supply ports H1102 are formed in a silicone substrate H1110.

The silicone substrate H1110 has a thickness of 0.5 mm to 1.0 mm, in which the ink supply ports H1102 are formed by anisotropic etching. Heating resistors H1103 are formed on the silicone substrate H1110. The ejection ports H1107 are formed on the silicone substrate H1110 using a photolithography technology in such a manner that the heating resistors H1103 and the ejection ports H1107 correspond to each other. Furthermore, bumps H1105, made from gold or the like, are provided on the silicone substrate H1110, as electrodes for supplying electric signals and electric power for driving the heating resistors.

Tank Holder Unit

Next, the tank holder unit 200 that constitutes part of an ink supply member 21 (liquid supply member) having the characteristics of the present invention will be described with reference to FIG. 8B.

The tank holder unit 200 holds the ink tank 40 serving as an ink container and is constituted by a tank holder 210 (absorptive member) formed of a member having a laser-light absorptive property and a plate-like transmissive member 220 having a laser-light transmissive property. Since the transmissive member 220 and the tank holder 210 are joined together by laser welding, the ink supply member 21 having supply passages for supplying ink to the ink supply ports H1102 of the recording-element substrate H1101 is formed.

The ink supply member 21 is disposed between the ink tank 40 and the recording-element substrate H1101 and supplies ink contained in the ink tank 40 to the recording-element substrate H1101 through supply passages 224.

Although the embodiments of the present invention are configured such that the supply passage member having grooves 222 is integrally formed with the tank holder 210, a supply passage member formed of an absorptive member and a tank holder may be separately formed and thereafter, the supply passage member may be mounted to the tank holder 210.

In the embodiment shown in FIG. 8B, both the tank holder 210 and the transmissive member 220 have the grooves 222 that constitute the supply passages 224. Since the present invention is configured such that the tank holder 210 and the transmissive member 220 are joined together to form the supply passages 224, one or both of the tank holder 210 and the transmissive member 220 should have grooves 222 for forming the supply passages 224, as appropriate.

To weld the tank holder 210 and the transmissive member 220 together using laser light, it is necessary that one of them have a laser-light transmissive property and the other have a laser-light absorptive property.

In the embodiments of the present invention, the tank holder 210 is formed of an absorptive member, and the plate-like member 220 is made of a laser-light transmissive member in view of easy laser-light irradiation. Which member is given the transmissive property and which member is given the absorptive property can be changed as desired.

In the embodiments of the present invention, the laser-light transmissive member refers to a member having a transmittance of 30% or more when the member with a thickness of 2.0 mm is irradiated with laser light, and the laser-light absorptive member refers to a member having an absorptance of 90% or more when the member with a thickness of 2.0 mm is irradiated with laser light. The use of the members with the foregoing transmittance and absorptance allows laser welding of the transmissive member and the absorptive member.

In the embodiments of the present invention described below, a transparent noryl "Type No. TPN9221" (manufactured by SABIC (Saudi Basic Industries Corporation) Innovative Plastics (formerly GE (General Electric Company) Plastics)) was employed as the material of the transmissive member. This transparent noryl is a transparent material having a laser-light transmissive property and also an excellent ink-resistant property. As an alternative, a transparent noryl containing no coloring material "Type No. TN300" (manufactured by the same company) may be used.

Here, the "noryl" is a trademark of modified polyphenylene ether or modified polyphenylene oxide. The noryl is polyphenylene ether or polyphenylene oxide that is modified to enhance heat resistance and strength. The noryl belongs to thermoplastic resin and has the characteristic of strong acid and alkaline resistance.

For the material of the absorptive member, a black noryl "Type No. SE1X" (manufactured by the same company) containing coloring or pigment that absorbs laser light was employed.

Hereinafter, specific embodiments of the present invention will be described with reference to the drawings.

First Embodiment

A first embodiment of the present invention will be described with reference to FIGS. 1A to 5.

Figure 2A:
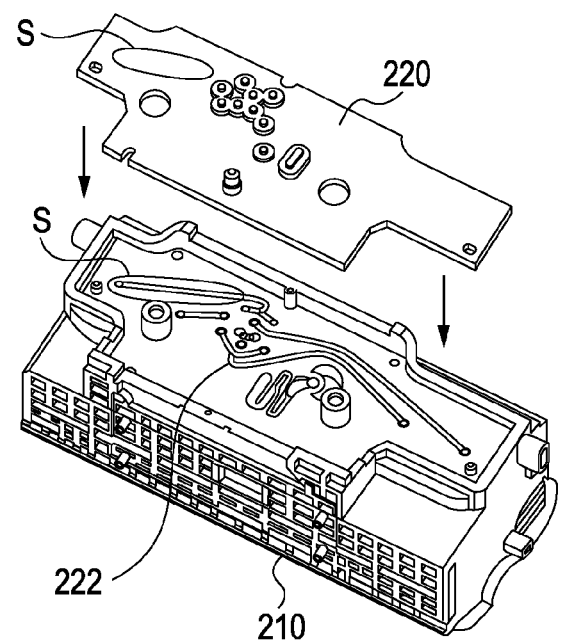
FIG. 2A is a perspective view of a liquid supply member of the first embodiment of the present invention, illustrating a laser welding process.
Figure 2B:
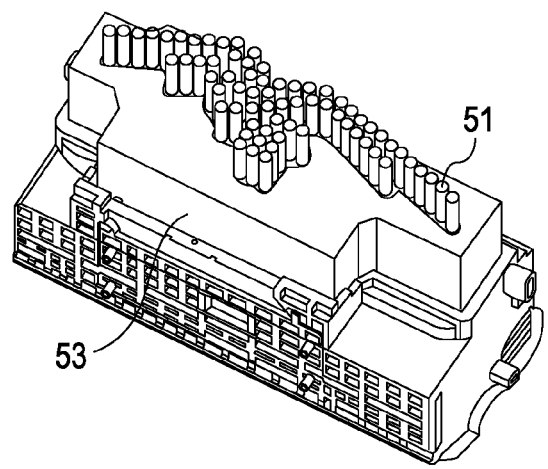
FIG. 2B is a perspective view of the liquid supply member of the first embodiment of the present invention, illustrating the laser welding process.
Figure 2C:
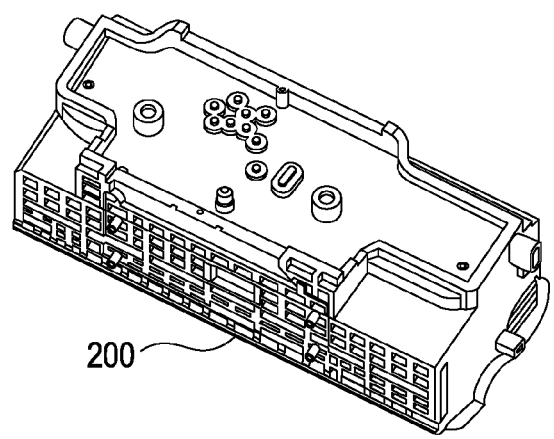
FIG. 2C is a perspective view of the liquid supply member of the first embodiment of the present invention, illustrating the laser welding process.

The process of manufacturing the ink supply member 21 by laser welding will be described with reference to FIGS. 2A to 2C. FIGS. 2A to 2C are perspective views illustrating the process of mounting the transmissive member 220 to the tank holder 210 (absorptive member) formed of a member having absorbency for laser light to form supply passages 224.

First, as shown in FIG. 2A, the transmissive member 220 and the tank holder 210 are prepared and are brought into contact with each other, with the surfaces thereof having grooves 222 inside.

Next, as shown in FIG. 2B, after the process in FIG. 2A, the transmissive member 220 and the tank holder 210 are brought into close contact with each other, with the transmissive member 220 held with a presser jig 53, and laser light is radiated from a laser-light irradiation unit 51 all together.

FIG. 2C illustrates a state in which the transmissive member 220 and the tank holder 210 are joined together (tank holder unit 200).

Figure 3:
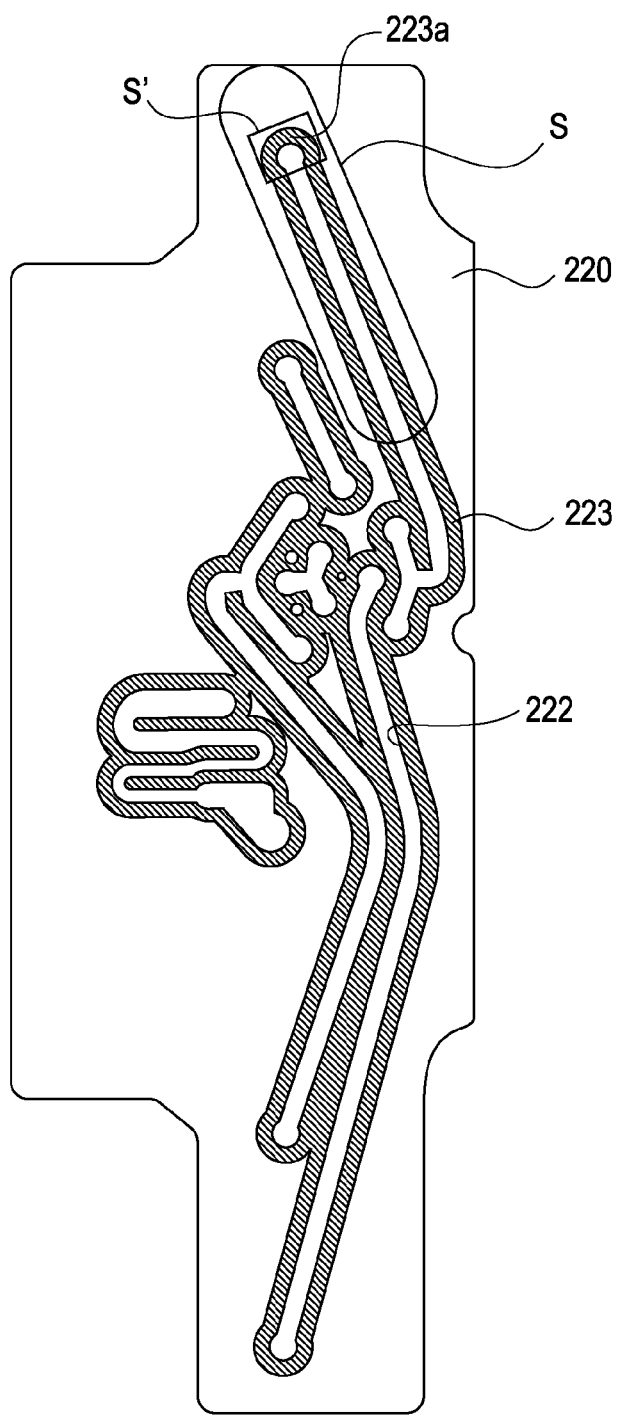
FIG. 3 is a plan view of a transmissive member for use in the liquid supply member of the first embodiment of the present invention.

Next, the arrangement of the grooves 222 to be formed into the supply passages 224 of the ink supply member 21 will be described with reference to FIG. 3. FIG. 3 is a diagram of the transmissive member 220, as viewed from the surface to be welded to the tank holder 210.

As shown in FIG. 3, this embodiment includes an area in which the grooves 222 to be formed into the ink supply passages 224 are disposed closely and an area in which the grooves 222 are disposed separately. The area in which the grooves 222 are closely disposed includes an area in which the plurality of grooves 222 are arranged in proximity and an area in which one contiguous groove 222 is bent so that the portions of the groove 222 are close to each other. On the other hand, the area in which the grooves 222 are disposed separately is an area in which no closely disposed groove 222 is present but independently disposed grooves 222 are present. The present invention is also applied to a case in which only the area in which the grooves 222 are disposed separately is present.

Next, formation of the supply passages 224 by laser welding will be specifically described with reference to FIGS. 1A to 1C, FIGS. 4A to 4C, and FIGS. 5A to 5C.

Figure 1A:
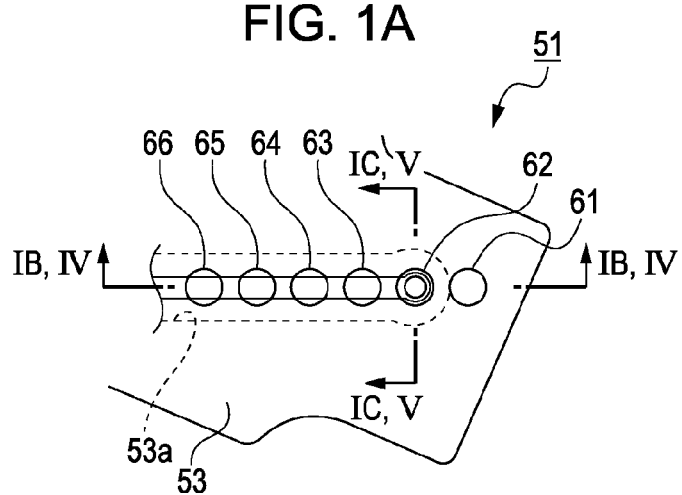
FIG. 1A is a diagram for describing a first embodiment of the present invention.
Figure 1B:
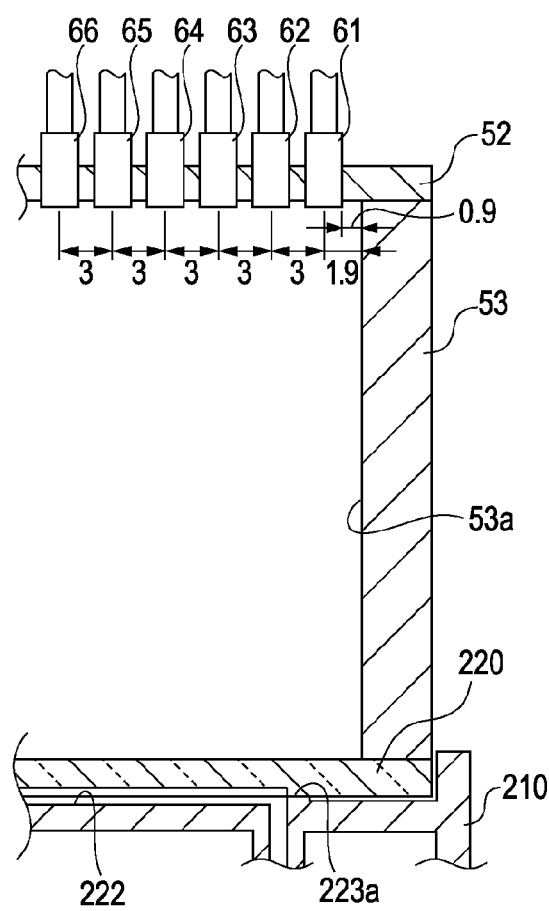
FIG. 1B is a diagram for describing the first embodiment of the present invention.
Figure 1C:
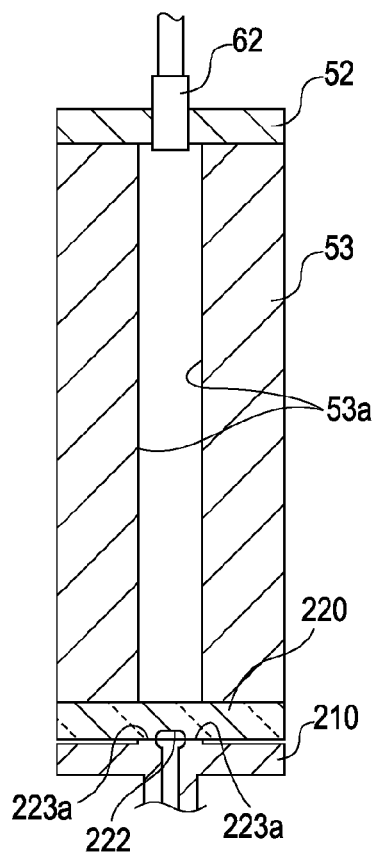
FIG. 1C is a diagram for describing the first embodiment of the present invention.

FIGS. 1A to 1C are diagrams for describing the vicinity of an end of the groove 222 in the longitudinal direction in the area in which the groove 222 is disposed separately (for example, an area S in FIG. 2A and 3) during irradiation with laser light, shown in FIG. 2B. FIG. 1A is a diagram of the vicinity of the end of the groove 222 in the state of FIG. 2B, as viewed from a direction in which laser light 70 is radiated.

FIGS. 4A to 4C are cross-sectional views taken along line IV-IV in FIG. 1A, for describing formation of the ink supply member 21 by laser welding. FIGS. 4A to 4C correspond to FIGS. 2A to 2C, respectively.

Figure 5B:
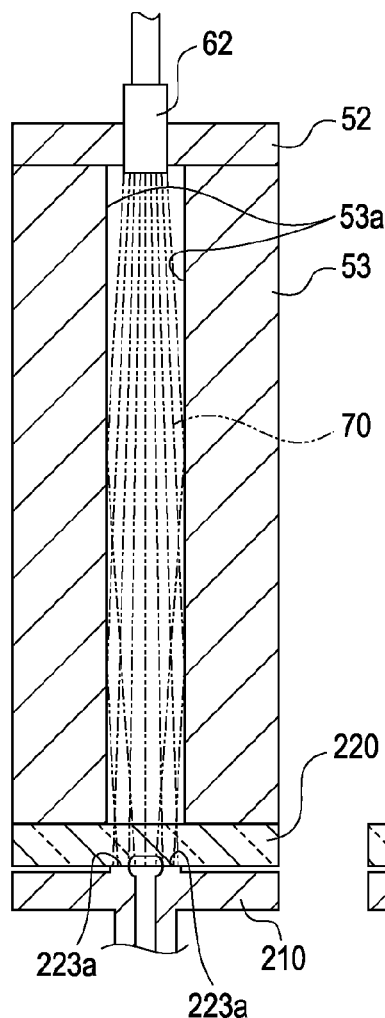
FIG. 5B is a diagram for describing the first embodiment of the present invention.
Figure 5A:
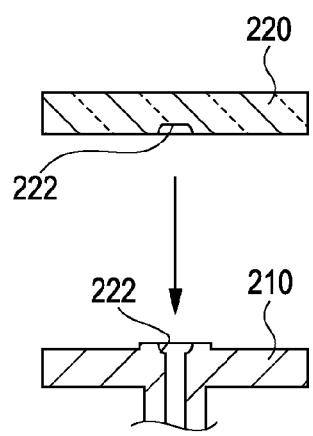
FIG. 5A is a diagram for describing the first embodiment of the present invention.
Figure 5C:
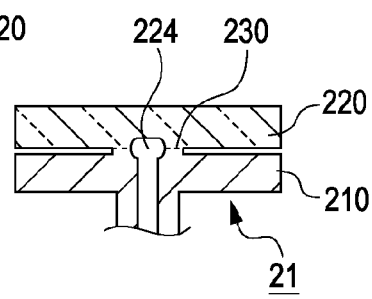
FIG. 5C is a diagram for describing the first embodiment of the present invention.

FIGS. 5A to 5C are cross-sectional views taken along line V-V in FIG. 1A, for describing formation of the ink supply member 21 by laser welding. FIGS. 5A to 5C correspond to FIGS. 2A to 2C, respectively.

As shown in FIGS. 4A to 4C and FIGS. 5A to 5C, this embodiment is configured such that both the tank holder 210 and the transmissive member 220 are provided with the grooves 222 formed into the supply passages 224.

When the tank holder 210 and the transmissive member 220 are brought into contact with each other, with the grooves 222 inside, the tank holder 210 and the transmissive member 220 are brought into contact along the periphery of the grooves 222 provided in the tank holder 210 and the transmissive member 220. The diagonally shaded portion 223 in FIG. 3 is the contact portion of the transmissive member 220 with the tank holder 210. The contact portion 223 is provided in the vicinity of the grooves 222 so as to surround the periphery of the grooves 222 in this manner.

The periphery of the contact portion 223 between the tank holder 210 and the transmissive member 220 is a noncontact portion at which the tank holder 210 and the transmissive member 220 are not in contact.

Thus, providing the contact portion and the noncontact portion allows pressure to be concentrated only to the contact portion 223 when the tank holder 210 and the transmissive member 220 are brought into contact with each other, thus enhancing the adherence thereof.

As shown in FIGS. 4A to 4C and FIGS. 5A to 5C, when the contact portion 223 is irradiated with the laser light 70, coloring or pigment contained in the tank holder 210 generates heat to melt the resin, and the heat generated at that time is transferred to the transmissive member 220. The transmissive member 220 is also melted due to the transferred heat, so that the contact portion 223 becomes a joint portion 230. Since the tank holder 210 and the transmissive member 220 are welded together, the grooves 222 are formed into the supply passages 224.

Next, referring to FIGS. 1A to 1C, the laser-light irradiation unit 51 will be described. FIG. 1B is a cross-sectional view taken along line IB-IB in FIG. 1A, and FIG. 1C is a cross-sectional view taken along line IC-IC in FIG. 1A.

The laser-light irradiation unit 51 includes a plurality of laser light irradiators (laser light sources) 61 to 66, a fixing plate 52 for fixing the laser light irradiators 61 to 66, and the presser jig 53 that presses the transmissive member 220 to the tank holder 210.

As shown in FIG. 2B, the laser light irradiators 61 to 66 are disposed above and along the grooves 222. In this embodiment, the laser light irradiators 61 to 66 are disposed at substantially regular intervals, with the distance from the centers of the individual laser light irradiators to the centers of adjacent irradiators set at 3 mm. The outputs of the individual laser light irradiators are substantially equal. In the case where the configuration of the grooves 222 to be formed into the supply passages 224, as of the ink supply member 21 used in the inkjet recording head 20, is minute, laser light irradiators having an emission hole diameter larger than the width of the supply passages 224 are used. This allows the entire area of the grooves 222 and the contact portion 223 to be irradiated with the laser light 70 during laser welding.

Although a semiconductor laser (wavelength: 980 nm) is used as the laser light 70, the kind of laser light is not particularly limited; laser light having a wavelength that allows the laser light to pass through the transmissive member 220 should be used.

The presser jig 53 is a device for introducing the laser light 70 to the contact portion 223 between the tank holder 210 and the transmissive member 220 while preventing the laser light 70 emitted from the laser light irradiators 61 to 66 from leaking to the outside. Therefore, the inner wall 53a of the presser jig 53, indicated by the dotted line in FIG. 1A, is shaped like the contact portion 223. By forming the inner wall 53a into a laser-light reflective member by gold plating or the like, the laser light 70 reflected by the inner wall 53a can be efficiently radiated to the contact portion 223.

Next, radiation of the laser light 70 to the vicinity of an end of the groove 222 in the longitudinal direction in an area in which the groove 222 is disposed separately (for example, the area S in FIGS. 2A and 3), which is a characteristic of the present invention, will be described.

As shown in FIG. 4B, in this embodiment, the laser light 70 is emitted from the plurality of laser light irradiators 61 to 66 (first laser light sources) disposed along the longitudinal direction of the grooves 222 toward the contact portion 223. At the same time, the laser light irradiator 61 (second laser light source) disposed in the vicinity of the laser light irradiator 62 at the end of the groove 222 in the longitudinal direction radiates the laser light 70 toward the vicinity of the end of the groove 222 in the longitudinal direction, outside the contact portion 223 of the tank holder 210. As shown in FIG. 1A etc., this laser light irradiator 61 is disposed above the groove 222, at a position other than positions corresponding to the grooves 222.

By radiating the laser light 70 with the laser light irradiator 61 disposed in this manner, heat is generated also at a periphery of a contact portion 223a (hereinafter referred to as an end contact portion) at the end of the groove 222 in the longitudinal direction of the tank holder 210. The end contact portion 223a here is a contact portion in an area S' of FIG. 3, for example. This can reduce heat diffusion at the end contact portion 223a in which there is a great possibility that an unwelded portion is likely to be generated because heat is prone to diffuse to the surroundings. This can therefore reduce the possibility that the end contact portion 223a is insufficiently welded, thus allowing the ink supply member 21 in which the possibility of external leakage of ink is reduced to be provided.

In this embodiment, the plurality of laser light sources having substantially the same strength of laser light are disposed at substantially regular intervals along the grooves 222, and the contact portion 223 are irradiated with the laser light 70 all at one time. The laser light 70 emitted from the laser light irradiators 61 to 66 spreads out in the radiating direction at a predetermined angle. Therefore, even for an area in which the grooves 222 are disposed closely and an area in which the grooves 222 are disposed separately, the number of irradiators for irradiating a contact portion in the vicinity of a midpoint of the length of the grooves 222 is smaller than the number of irradiators for irradiating the end contact portion 223a. Therefore, the amount of laser light 70 radiated to the contact portion 223a is smaller than that to the other portions. This seems to be the cause that heat diffusion at the end contact portion 223a is larger than that at the other portions.

As shown in FIG. 1A, when the laser light irradiator 61 is disposed on the extension of the end of the grooves 222 in the longitudinal direction, the end contact portion 223a, which is significantly affected by heat escape, can be efficiently heated, which is more advantageous. However, the position of the laser light irradiator 61 is not limited to the position shown in FIGS. 1A and 1B because heat escape from the end contact portion 223a has only to be reduced.

Although one laser light irradiator 61 (second laser light source) is disposed in the above description, the number of second laser light sources disposed above the groove 222, at positions other than the position corresponding to the groove 222, may be plural.

The embodiment shown in FIGS. 2A to 2C is configured such that the laser light irradiators 62 to 66 (first laser light sources) are disposed in line along the length of the grooves 222. However, the present invention is not limited to this configuration but may be configured such that a plurality of laser light irradiators are disposed in positions corresponding to the grooves 222 in the lateral direction and may be disposed along the length of the grooves.

Second Embodiment

Next, a second embodiment of the present invention will be described with reference to FIGS. 6A and 6B.

Figure 6A:
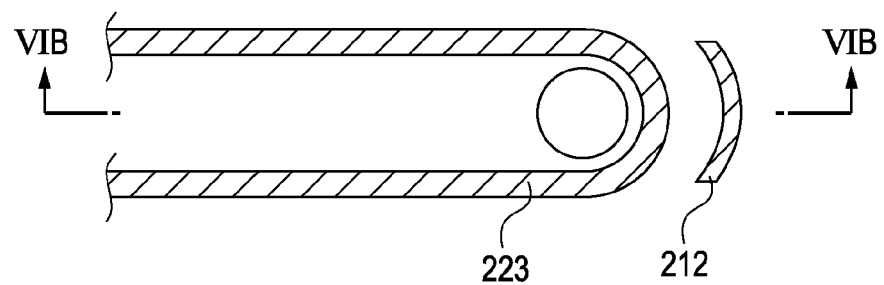
FIG. 6A is a diagram for describing a second embodiment of the present invention.
Figure 6B:
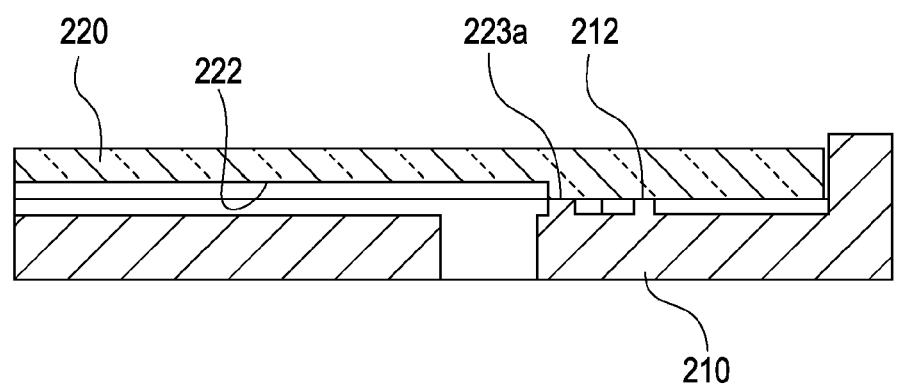
FIG. 6B is a diagram for describing the second embodiment of the present invention.

FIGS. 6A and 6B are diagrams for describing a portion including an end of the groove 222 in the longitudinal direction in an area in which the groove 222 is disposed separately (for example, the area S in FIG. 2A) in this embodiment. FIG. 6A is a diagram for describing contact portions of the tank holder 210 with the transmissive member 220, in which the diagonally slanted portions indicate the contact portions.

FIG. 6B is a cross-sectional view taken along line VIB-VIB in FIG. 6A, when the tank holder 210 and the transmissive member 220 are in contact.

Since the method for laser welding and the material of the ink supply member 21 are the same as those of the first embodiment, descriptions thereof will be omitted. This embodiment is also configured, as in the first embodiment, such that, in addition to the laser light irradiators 62 to 66 provided above the grooves 222, the laser light irradiator 61 (second laser light source) is disposed at the portion other than the portions corresponding to the grooves 222. The laser light 70 is radiated from this laser light irradiator 61 to the vicinity of the end of the groove 222 in the longitudinal direction outside the contact portion 223 of the tank holder 210.

This embodiment further has a contact portion 212, at which the tank holder 210 and the transmissive member 220 are in contact (see FIGS. 6A and 6C), at a portion irradiated by the laser light irradiator 61 (FIGS. 1A to 1C), in addition to the contact portion 223 provided in the vicinity of and at a periphery of the grooves 222.

Thus, the heat generated in the tank holder 210 due to irradiation by the laser light irradiator 61 is transferred also to the transmissive member 220 via the contact portion 212. This can reduce heat diffusion from the end contact portion 223a not only at the tank holder 210 side but also at the transmissive member 220 side to the surroundings. This can reduce formation of an unwelded portion at the end contact portion 223a.

Although the above configuration is such that the contact portion 212 is provided at a portion irradiated by the laser light irradiator 61, heat diffusion has only to be reduced owing to heat transfer to the transmissive member 220 via the contact portion 212. Therefore, the contact portion 212 may be provided not at the portion irradiated by the laser light irradiator 61 but at the vicinity thereof. However, the contact portion 212 is more preferably provided at the portion irradiated by the laser light irradiator 61 because the heat generated in the tank holder 21 is efficiently transferred to the transmissive member 220.

The configuration in which the arc-shaped contact portion 212 is provided at the position shown in FIGS. 6A and 6B can more effectively reduce heat diffusion at the end contact portion 223a. Generation of an unwelded portion should be reduced by transferring heat generated in the tank holder 210 due to irradiation by the laser light irradiator (second laser light source) to the transmissive member 220 via the contact portion 212. Therefore, the contact portion 212 may be provided at a plurality of positions, and the shape thereof is not limited to the arc shape shown in FIGS. 6A and 6B.

Third Embodiment

Next, a third embodiment of the present invention will be described with reference to FIGS. 7A and 7B.

Figure 7A:
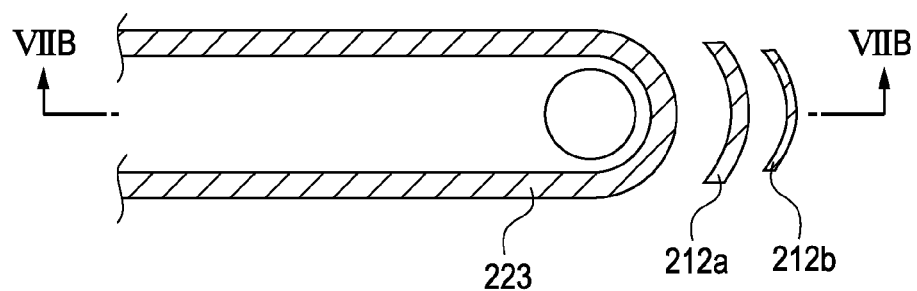
FIG. 7A is a diagram for describing a third embodiment of the present invention.
Figure 7B:
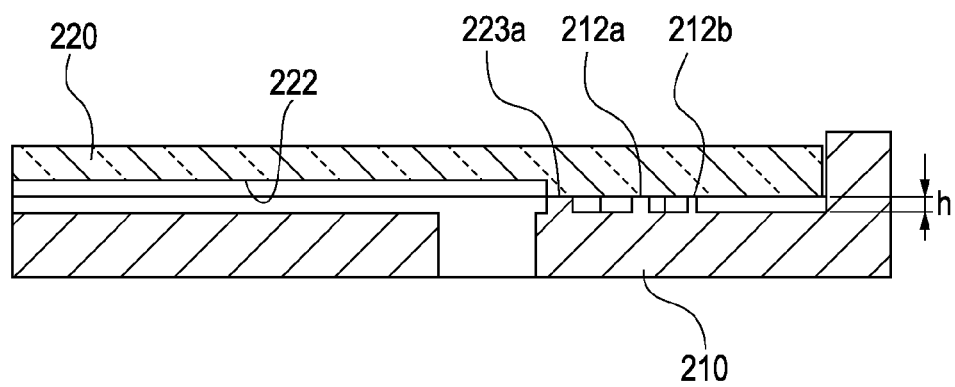
FIG. 7B is a diagram for describing the third embodiment of the present invention.

FIGS. 7A and 7B are diagrams for describing a portion including an end of the groove 222 in the longitudinal direction in an area in which the groove 222 is disposed separately (for example, the area S in FIG. 2A) in this embodiment. FIG. 7A is a diagram for describing contact portions of the tank holder 210 with the transmissive member 220, in which the diagonally slanted portions indicate the contact portions. FIG. 7B is a cross-sectional view taken along line VIIB-VIIB in FIG. 7A, when the tank holder 210 and the transmissive member 220 are in contact.

Since the method for laser welding and the material of the ink supply member 21 are the same as those in the foregoing embodiments, descriptions thereof will be omitted.

This embodiment also has the contact portion 212 in addition to the contact portion 223 provided in the vicinity of and at a periphery of the grooves 222. The contact portion 212 is disposed at a portion irradiated by the laser light irradiator 61 (second laser light source) that radiates the laser light 70 toward the vicinity of the end of the groove 222 in the longitudinal direction, outside the contact portion 223.

The characteristic of this embodiment is that the contact portion 212 is divided into a contact portion 212a and a contact portion 212b, and the contact portions 212a and 212b are disposed along the length of the groove 222.

In order to transfer much more heat toward the transmissive member 220 through the contact portion 212 to reduce heat escape at the end contact portion 223a at the transmissive member 220 side, the area of the contact portion 212 should be increased. However, the increase in the area of the contact portion 212 may pose the following problems.

When irradiated with the laser light 70, the contact portion 212 is melted to cause a weld burr. The burr flows into a noncontact portion in the vicinity of the contact portion 212. However, if the area of the contact portion 212 is large, the burr may increase to squeeze out from the noncontact portion, thus hindering appropriate welding at the contact portion 223 at a periphery of the groove 222.

Thus, providing the contact portion 212 at a plurality positions as in this embodiment can reduce the influence of the burr on the contact portion 212 while increasing the area of the contact portion 223.

If the contact portion 212 has a large area, a large amount of heat is necessary for welding, which may hinder the contact portion 212 from being given an amount of heat necessary for welding, thus hindering sufficient welding. With laser welding, the contact portion 212 falls, so that the height h of the contact portion 212 from the noncontact portion after welding becomes lower than the height h before welding (see FIG. 7B). Assume that laser welding is performed with the heights h of the contact portion 223 at a periphery of the groove 222 and the contact portion 212 for reducing generation of an unwelded portion set substantially equal. In this case, if welding at the contact portion 212 is insufficient, the transmissive member 220 sticks in the contact portion 212, thus hindering appropriate welding at the contact portion 223. This may cause ink leakage from the supply passages 224 in the formed ink supply member 21.

Therefore, the area of the contact portion 212b distant from the groove 222 should be smaller than that of the contact portion 212a. Heat is prone to escape to the surroundings with distance from the groove 222, so that much more heat is needed for appropriate welding. Therefore, decreasing the area of the contact portion 212b can reduce the possibility that the contact portion 212 will be unwelded.

Although the configuration in which the contact portion 212 is divided into two parts has been described here, the foregoing effects have only to be given; the contact portion 212 may be divided into three or more parts. The shape of the contact portion 212 is not limited to the shape shown in FIGS. 7A and 7B, as in the second embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-263075 filed Nov. 18, 2009, which is hereby incorporated by reference herein in its entirety.

What is claimed is:

1. A method for manufacturing a liquid supply member for supplying liquid to a liquid ejection port, wherein
the liquid supply member includes a transmissive member being transmissive to laser light and an absorptive member being absorbent to laser light, and at least one of the transmissive member and the absorptive member has a groove to be formed into a supply passage through which liquid is supplied to the ejection port,
the method comprising:
bringing the transmissive member and the absorptive member into contact with each other, with the groove inside;
forming the supply passage by radiating laser light, via the transmissive member, from a plurality of first laser light sources disposed along a longitudinal direction of the groove toward a first contact portion at a periphery of the groove, at which the transmissive member and the absorptive member are in contact, to weld the transmissive member and the absorptive member together at the first contact portion; and
at the forming the supply passage, radiating laser light, via the transmissive member, from a second laser light source provided in a vicinity of a laser light source, among the plurality of the first laser light sources, toward a vicinity portion of the absorptive member, outside the first contact portion, in a vicinity of an end of the groove in the longitudinal direction, in parallel with the radiation of laser light from the plurality of the first laser light sources.

2. The method for manufacturing the liquid supply member according to claim 1, wherein
the vicinity portion is located on an extension of the groove in the longitudinal direction.

3. The method for manufacturing the liquid supply member according to claim 1, wherein
a second contact portion separate from the first contact portion at which the transmissive member and the absorptive member are in contact is provided in a vicinity of the vicinity portion.

4. The method for manufacturing the liquid supply member according to claim 1, wherein
the second contact portion is provided at the vicinity portion.

5. The method for manufacturing the liquid supply member according to claim 4, wherein
a plurality of the second contact portions are provided on the extension of the groove in the longitudinal direction, wherein areas of the second contact portions are smaller with distance from the groove in the longitudinal direction.

6. A liquid supply member for supplying liquid to a liquid ejection port, the liquid supply member comprising:
a transmissive member being transmissive to laser light;
an absorptive member being absorbent to laser light; and
a groove to be formed into a supply passage through which liquid is supplied to the ejection port, the groove being provided in at least one of the transmissive member and the absorptive member;
a supply passage formed by welding the transmissive member and the absorptive member together, with the groove inside, at a first contact portion at a periphery of the groove by radiating laser light toward the first contact portion via the transmissive member; and
a second contact portion, separate from the first contact portion, at which the transmissive member and the absorptive member are in contact, provided in a vicinity of an end of the groove in a longitudinal direction, outside the first contact portion.

7. The liquid supply member according to claim 6, wherein
a plurality of the second contact portions are provided in the longitudinal direction, wherein areas of the second contact portions are smaller with distance from the groove in the longitudinal direction.

8. A method for manufacturing a liquid ejection head including a liquid ejection port and a liquid supply member configured to supply liquid to the ejection port, wherein
the liquid supply member includes a transmissive member being transmissive to laser light and an absorptive member being absorbent to laser light, and at least one of the transmissive member and the absorptive member has a groove to be formed into a supply passage through which liquid is supplied to the ejection port,
the method comprising:
bringing the transmissive member and the absorptive member into contact with each other, with the groove inside;
forming the supply passage by radiating laser light, via the transmissive member, from a plurality of first laser light sources disposed along a longitudinal direction of the groove toward a first contact portion at a periphery of the groove, at which the transmissive member and the absorptive member are in contact, to weld the transmissive member and the absorptive member together at the first contact portion; and
at the forming the supply passage, radiating laser light, via the transmissive member, from a second laser light source provided in a vicinity of a laser light source, among the plurality of the first laser light sources, toward a vicinity portion of the absorptive member, outside the first contact portion, in a vicinity of an end of the groove in the longitudinal direction, in parallel with the radiation of laser light from the plurality of the first laser light sources.

* * * * *